(12) United States Patent
Shellhammer et al.

(10) Patent No.: US 8,577,377 B2
(45) Date of Patent: Nov. 5, 2013

(54) METHODS AND APPARATUS FOR PROVIDING A WIRELESS EXPANSION NETWORK

(75) Inventors: Stephen J. Shellhammer, Ramona, CA (US); Ahmed K. Sadek, San Diego, CA (US); Cong T. Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 12/357,797

(22) Filed: Jan. 22, 2009

(65) Prior Publication Data

US 2010/0184435 A1 Jul. 22, 2010

(51) Int. Cl.
*H04W 36/00* (2009.01)

(52) U.S. Cl.
USPC ........... 455/444; 455/443; 455/448; 455/438; 455/453; 455/420; 370/338; 370/341; 370/441; 370/331; 370/335

(58) Field of Classification Search
USPC ........... 455/432.1–454, 464, 422, 509, 552.1, 455/439, 442–444, 522, 226.1, 450, 561, 455/550.1, 556.2; 370/38, 329, 318, 335, 370/434, 468, 331, 332, 338, 328, 342, 441, 370/211, 431, 465, 401
See application file for complete search history.

(56) References Cited

U.S. PATENT DOCUMENTS

| | | | | |
|---|---|---|---|---|
| 7,748,051 | B2 * | 6/2010 | Morimoto et al. | 726/32 |
| 2003/0109257 | A1 * | 6/2003 | Nilsson et al. | 455/436 |
| 2006/0063533 | A1 | 3/2006 | Matoba et al. | |
| 2006/0274685 | A1 * | 12/2006 | Johnson et al. | 370/328 |
| 2009/0010258 | A1 | 1/2009 | Ayoub et al. | |

FOREIGN PATENT DOCUMENTS

| | | |
|---|---|---|
| EP | 1065897 A1 | 1/2001 |
| EP | 1850610 A1 | 10/2007 |
| JP | 2005512430 A | 4/2005 |
| JP | 2006094003 A | 4/2006 |
| KR | 20050058267 A | 6/2005 |

(Continued)

OTHER PUBLICATIONS

Cabric, D. et al., "Implementation Issues in Spectrum Sensing for Cognitive Radios", Conference Record of the Thirty-Eighth Asilomar Conference on Signal, Systems and Computers, Nov. 2004, pp. 772-776 vol. 1, XP-010781056.

(Continued)

*Primary Examiner* — Vladimir Magloire
*Assistant Examiner* — Babar Sarwar
(74) *Attorney, Agent, or Firm* — Kam T. Tam; Mary A. Fales

(57) ABSTRACT

Methods and apparatus for providing a wireless expansion network. In an aspect, an apparatus includes an expansion circuit configured to identify at least one of a selected uplink (UL) channel and a selected downlink (DL) channel that are provided by one of a primary network and an expansion network, and a processing circuit configured to switch to the at least one of the selected UL and DL channels. An apparatus includes means for obtaining link parameters associated with a primary network and an expansion network, means for identifying clients that are assigned transmission channels on both the primary network and the expansion network based on the link parameters, and means for transmitting messages to the clients to indicate the assigned transmission channels.

37 Claims, 8 Drawing Sheets

(56) References Cited

FOREIGN PATENT DOCUMENTS

| | | |
|---|---|---|
| WO | WO03049480 A1 | 6/2003 |
| WO | 2006088082 A1 | 8/2006 |
| WO | WO2006130318 | 12/2006 |
| WO | 2008013429 A2 | 1/2008 |

OTHER PUBLICATIONS

International Search Report/Written Opinion—PCT/US09/037990—International Search Authority EPO—Sep. 18, 2009.

Taiwan Search Report—TW098109418—TIPO—Jun. 18, 2012.

\* cited by examiner

12
METHODS AND APPARATUS FOR PROVIDING A WIRELESS EXPANSION NETWORK

BACKGROUND

1. Field

The present application relates generally to the operation of wireless communication systems, and more particularly, to methods and apparatus for providing a wireless expansion network to increase the capacity and performance of a primary network.

2. Background

Wireless cellular networks typically operate in licensed spectrum. However, the availability of licensed spectrum and/or its regulation often limits the number of users and services that a network can support. For example, a typical cellular network covers a geographic region by using multiple base stations where each base station covers a portion of the region. In such a network, each base station services a number of client stations within its area of coverage. Modern cellular networks offer both voice and data services. With the continuing increase in demand for higher levels of service, the capacities of these networks are stretched to the limit due to the limited availability of licensed spectrum.

Therefore, what is needed is a mechanism to increase the capacity and/or performance of wireless networks that typically utilize licensed spectrum.

SUMMARY

A network expansion system (comprising methods and apparatus) is provided that operates to efficiently expand a primary network with an expansion network to increase capacity and/or performance.

In an aspect, an apparatus is provided for network communication. The apparatus comprises an expansion circuit configured to identify at least one of a selected uplink (UL) channel and a selected downlink (DL) channel, wherein the selected UL channel is provided by one of a primary network and an expansion network, and wherein the selected DL channel is provide by one of the primary network and the expansion network. The apparatus also comprises a processing circuit configured to switch to the at least one of the selected UL and DL channels.

In an aspect, a method is provided for network communication. The method comprises identifying at least one of a selected UL channel and a selected DL channel, wherein the selected UL channel is provided by one of a primary network and an expansion network, and wherein the selected DL channel is provide by one of the primary network and the expansion network. The method also comprises switching to the at least one of the selected UL and DL channels.

In an aspect, an apparatus is provided for network communication. The apparatus comprises means for identifying at least one of a selected UL channel and a selected DL channel, wherein the selected UL channel is provided by one of a primary network and an expansion network, and wherein the selected DL channel is provide by one of the primary network and the expansion network. The apparatus also comprises means for switching to the at least one of the selected UL and DL channels.

In an aspect, an apparatus is provided for network communication. The apparatus comprises a processing circuit configured to obtain link parameters associated with a primary network and an expansion network, and an expansion control circuit configured to identify clients that are assigned transmission channels on both the primary network and the expansion network based on the link parameters. The apparatus also comprises a transceiver circuit configured to transmit messages to the clients to indicate the assigned transmission channels.

In an aspect, a method is provided for network communication. The method comprises obtaining link parameters associated with a primary network and an expansion network, and identifying clients that are assigned transmission channels on both the primary network and the expansion network based on the link parameters. The method also comprises transmitting messages to the clients to indicate the assigned transmission channels.

In an aspect, an apparatus is provided for network communication. The apparatus comprises means for obtaining link parameters associated with a primary network and an expansion network, and means for identifying clients that are assigned transmission channels on both the primary network and the expansion network based on the link parameters. The apparatus also comprises means for transmitting messages to the clients to indicate the assigned transmission channels.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a network expansion system that operates to efficiently expand a primary communication network with an expansion network. For example, the primary communication network comprises legacy wireless cellular networks, such as a CDMA network that utilizes licensed spectrum. However, it should be noted that the primary communication network is not limited to CDMA networks, and may comprise any other type of communication network.

The system operates to allow a primary network to be expanded through use of an expansion network. For example, the expansion network may utilize unlicensed transmission spectrum that is available within the geographic region of the primary network. For a more specific example, the unlicensed transmission spectrum may comprise available TV white space spectrum or any other available transmission spectrum. By utilizing the available transmission spectrum to expand a primary network, the expansion system operates to increase network capacity and/or performance.

Figure 1:
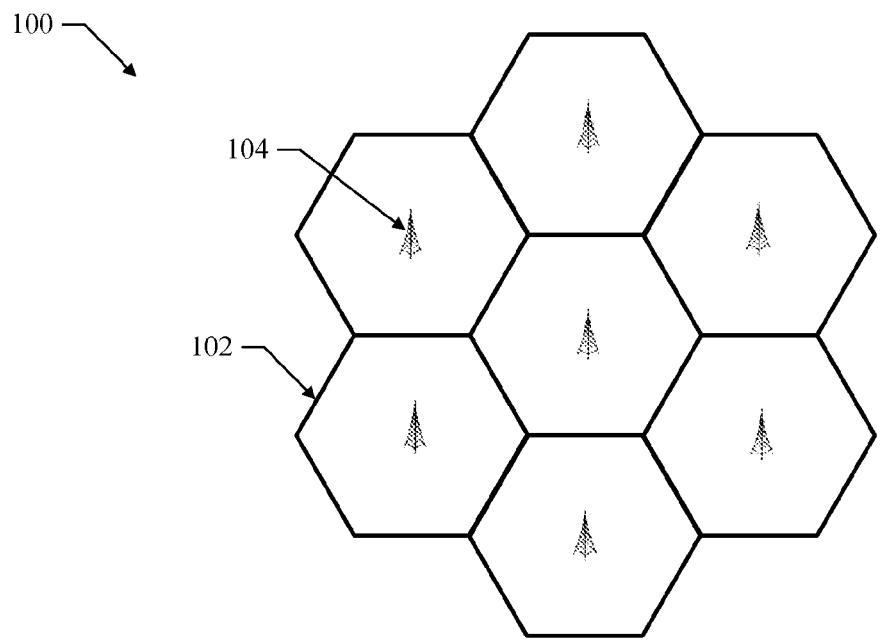
FIG. 1 shows a diagram that illustrates an exemplary deployment of a typical cellular network.

FIG. 1 shows a diagram that illustrates an exemplary deployment of a typical cellular network 100. The network 100 comprises a plurality of cells 102 in which reside one or more transceiver base stations 104. It should be noted that the network 100 is illustrative since actual deployments do not have such a regular cell structure. Within each cell 102, user devices operate to utilize the transceiver base stations to communicate with each other or with devices in other cells of the network. The network 100 utilizes licensed spectrum and so it operates under specific regulations and power requirements to provide communications between a selected number of devices that may operate within each cell. Thus, the network 100 illustrates an exemplary primary network whose capacity and/or performance may be limited due to licensing, regulation or other transmission limitations.

In accordance with the network expansion system, additional capacity and/or performance is supplied to the network 100 by utilizing an expansion network that operates in conjunction with network 100. The expansion network operates in available transmission spectrum (which may be unlicensed) within the same geographic region as the network 100. The capacity of the expansion network may be less than the primary network since the expansion network may be restricted by transmission power limits, propagation characteristics or other restrictions. Hence, the range or coverage of the expansion network may be less than that of the primary network 100; however, increases in capacity and/or performance may still be obtained by operating the expansion network in conjunction with the primary network.

Figure 2:
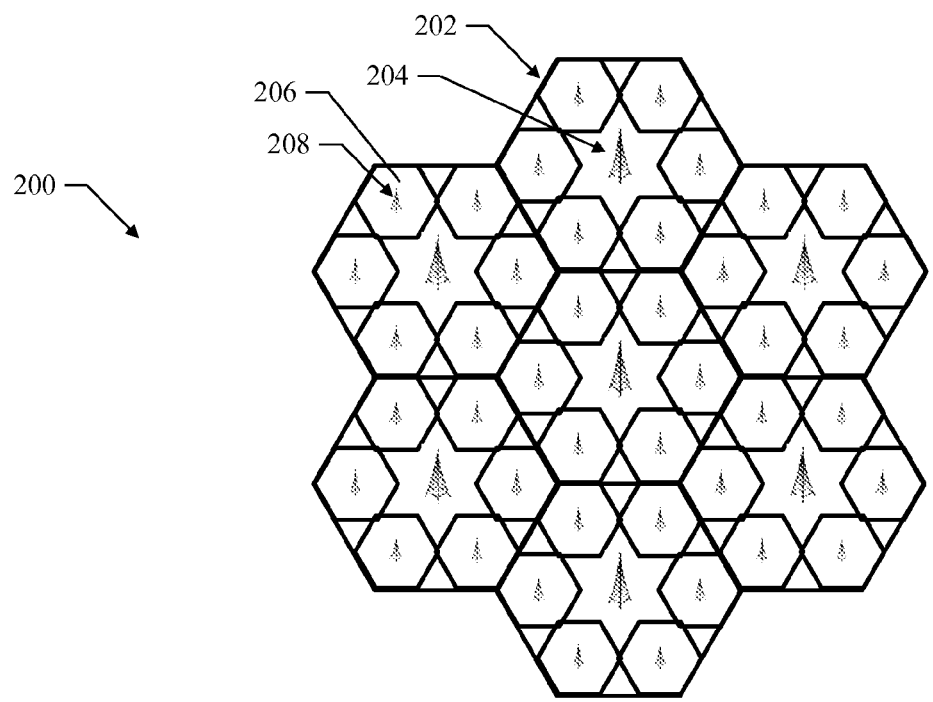
FIG. 2 shows a diagram that illustrates an exemplary network deployment that includes a primary network with an expansion network overlaying the primary network in accordance with the network expansion system.

FIG. 2 shows a diagram that illustrates an exemplary network deployment 200 that includes a primary network with an expansion network overlaying the primary network in accordance with the network expansion system.

Each cell 202 of the primary network is covered by a primary base station transceiver 204 that operates to provide communications between devices utilizing the primary network. Each cell 202 of the primary network also includes one or more cells 206 of the expansion network that include expansion base station transceivers 208. In one implementation, the expansion base stations of the expansion network are located at the same location as the primary base stations for the primary network. It is also possible for expansion base stations of the expansion network to be located away from the primary base stations and throughout the region of each primary cell.

In one configuration, each of the expansion base stations in the expansion network has access to a wired network so as to enable communications with centralized network controllers. However, in another configuration, the primary base stations have access to the wired network, while the expansion base stations in the expansion network do not have direct access to the wired network. In this configuration, the expansion base stations have a wireless communication link with the primary base stations in order to indirectly access the centralized controllers. In another configuration, remote expansion base stations connect wirelessly to selected expansion base stations that have access (either wired or wirelessly) to the primary network. Thus, in this configuration, the selected expansion base stations have access to the network while the remote expansion base stations (relay stations) connect indirectly to the network via the selected expansion base stations. This configuration provides a multi-hop expansion network.

During operation of the network expansion system, services are provided to client devices over one or both of the primary and expansion networks. The services provided to the client device comprise voice, data, multimedia services or any number of other types of services. The system operates to determine which services are to be provided to selected client devices using either the primary network or the expansion network or a combination of the two networks. The operation of the system to determine network selection and service delivery is described below.

One method of selecting which network to use to supply a service is a capacity off load method where the primary network is augmented by an expansion network to increase the total network capacity. An alternative method is to use the expansion network as an enhancement to the primary network where services with strict latency or other requirements (e.g. voice and multimedia services) are provided by the primary network and services without such requirements (e.g. data transfers) are provided by the expansion network.

In various implementations, the spectrum used for the expansion network can be any one or combination of the following spectrum types.
1. Licensed spectrum
2. Unlicensed spectrum (i.e., frequency bands such as 2.4 GHz and 5 GHz bands)
3. Unlicensed operation in licensed bands (e.g. TV white space)

For example, as currently operating in the United States, the unlicensed spectrum can include frequency bands, such as 2.4 gigahertz and 5 gigahertz bands. The unlicensed operation in the licensed bands can include the TV white space bands.

The air interface of the expansion network is typically derived from the air interface for the primary network. The expansion network does not have to carry all the control messages of the primary network since these are already carried by the primary network. It is assumed that any client device can always access the primary network, but the primary network may not have the capacity to handle all the service requests of the devices being served. The air interface in the expansion network may also include cognitive radio extensions such as spectrum sensing capability. This spectrum sensing capability is used in frequency bands where unlicensed devices are permitted to operate in channels that are unused by the licensed services. A typical example of this is the unlicensed operation in unused TV channels, also called TV white space channels. The primary network can be used to exchange all spectrum sensing measurement results so that signal quality measurements for each network that are determined at devices in the region can be analyzed. This simplifies the design of the air interface for the expansion network.

In an implementation where the expansion network comprises expansion base stations and relay stations, the link between the expansion base stations and the relay stations and the link between the relay stations and the client devices operate on either the same frequency channel or different frequency channels. If multiple unused channels are available, it is preferred to use different channels for the link between base stations to relay stations and the link between relay stations to clients.

Capacity Offload

In one implementation, the network expansion system operates as a capacity offload network to offload part of the primary network load to an expansion network. For example, the expansion network may be operating in unlicensed transmission spectrum and selected network services are provided to client using that unlicensed spectrum.

Figure 3:
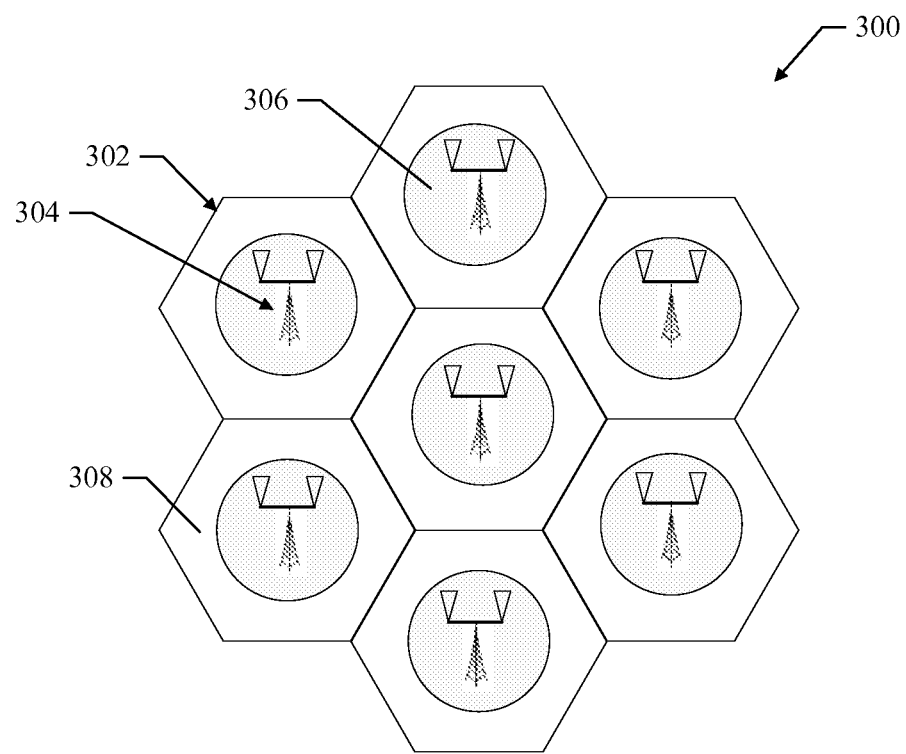
FIG. 3 shows a diagram that illustrates an exemplary network deployment that illustrates how unlicensed spectrum is used for capacity offload in the network expansion system.

FIG. 3 shows a diagram of an exemplary network deployment 300 that illustrates how unlicensed spectrum is used for capacity offload in the network expansion system. The deployment of FIG. 3 comprises a group of cells 302 where each cell comprises at least one transmission tower 304 having a primary base station and an expansion base station. In one mode of operation, fixed or portable users in the area 306 around each transmission tower are served by the expansion base station utilizing unlicensed transmission spectrum as part of the expansion network, while users in a remaining area 308 of a cell are served by the primary base station utilizing licensed transmission spectrum as part of the primary network.

Thus, in the deployment of the network 300 shown in FIG. 3, the expansion network is provided to serve good geometry (i.e., high SINR) users in the unlicensed band, and a primary network is provided to serve the rest of the users in the licensed band. This configuration of an expansion network makes for a very simple installation since additional base station sites are not required to be added to a primary network.

Figure 4:
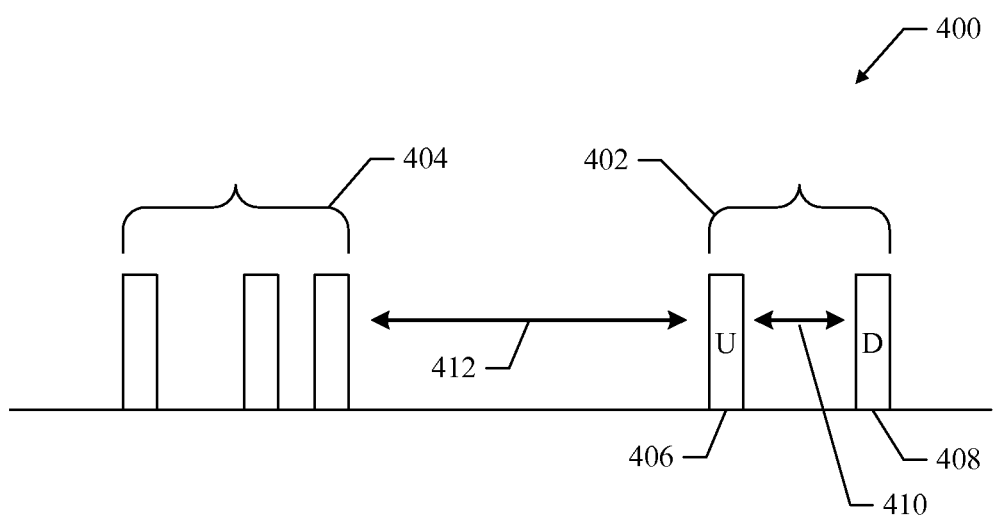
FIG. 4 shows a frequency map that illustrates exemplary frequency channels for use in the network expansion system.

FIG. 4 shows a frequency map 400 that illustrates exemplary frequency channels for use in the network expansion system. For example, the frequency map 400 shows frequency channels used in a primary (legacy) wireless network as illustrated at 402. The frequency map 400 also shows frequency channels available for use as part of an expansion network as illustrated at 404. In this example, the expansion channels 404 are located in unlicensed spectrum that was previously allocated for television transmissions, referred to as TV white space.

As illustrated in FIG. 4, the primary network channels comprise an uplink channel 406 and a downlink channel 408. In this example, the uplink and downlink have a carrier frequency of approximately 1900 MHz with approximately 30 to 50 MHz of channel separation as identified by the reference numeral 410. However, the expansion channels 404 are located at approximately 600 MHz which is separated from the primary channels 402 by approximately one gigahertz as identified by the reference numeral 412. Thus, the network expansion system provides enhanced channel separation by allowing one of the uplink 406 or downlink 408 channels to be assigned to the expansion spectrum. A more detailed description of the assignment of the uplink and downlink channels to the expansion spectrum will be described later.

Based on the primary and expansion transmission spectrums illustrated in FIG. 4, base stations and devices operating within the network may be configured to support four modes of operation as follows.

Figure 5:
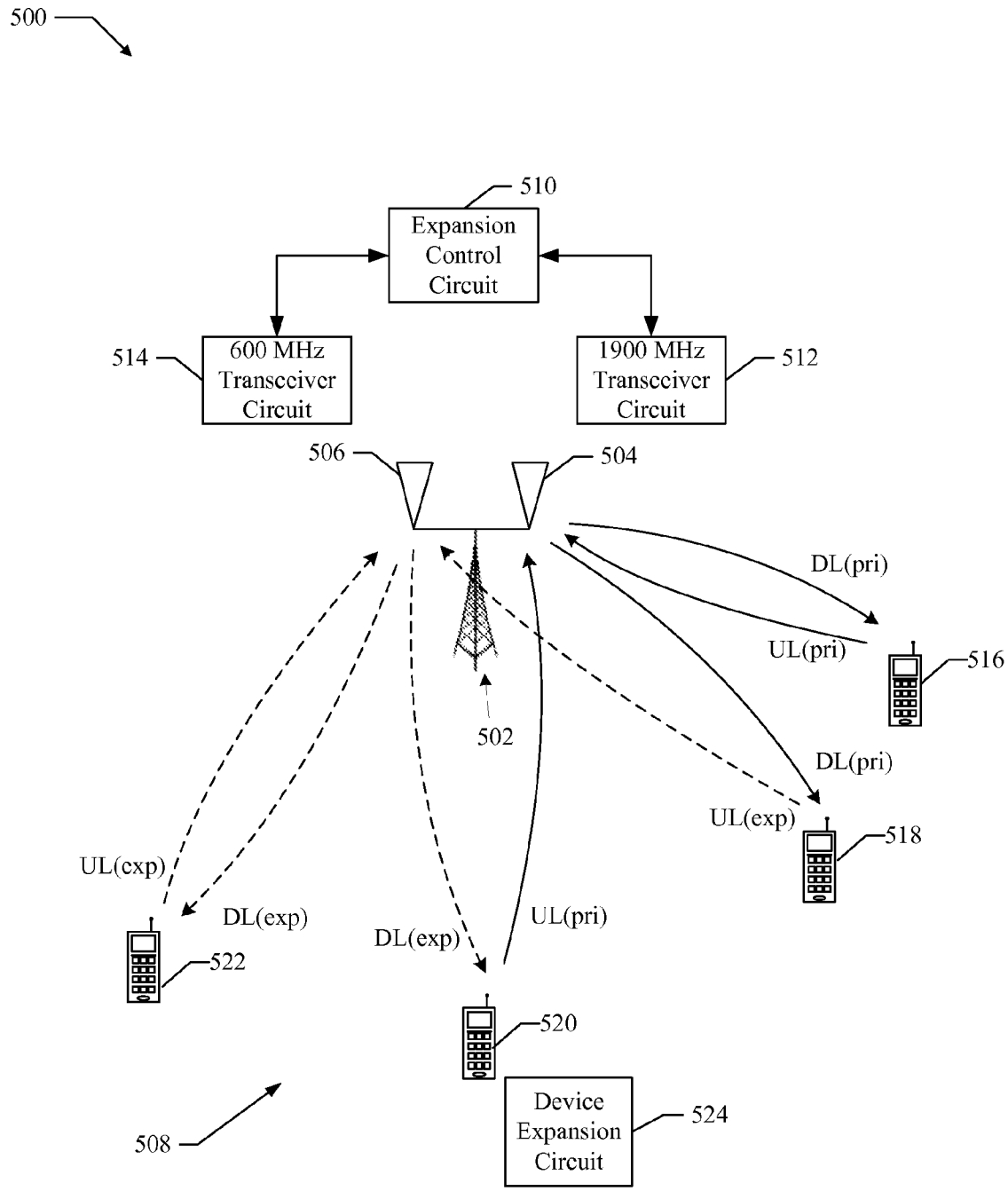
FIG. 5 shows a diagram illustrating an exemplary network cell that operates to provide primary and expansion networks in accordance with the network expansion system.

1. Mode 1: Primary Uplink and Primary Downlink
2. Mode 2: Primary Uplink and Expansion Downlink
3. Mode 3: Expansion Uplink and Primary Downlink
4. Mode 4: Expansion Uplink and Expansion Downlink FIG. 5 shows an exemplary network cell 500 operable to provide primary and expansion networks for use in the network expansion system. For example, the network cell 500 may be the network cell 302 shown in FIG. 3. The network cell 500 comprises transmission tower 502, primary base station 504, expansion base station 506, a plurality of devices 508, and expansion control circuit 510.

The network cell 500 operates to support the four modes of operation described above. For example, the primary base station 504 provides primary (pri) UL and DL communication channels. The expansion base station 506 provides expansion (exp) UL and DL communication channels. In this implementation, the expansion control circuit 510 operates to determine which of the devices 508 are to be serviced by the primary and expansion networks, and/or which services are to be provided by the primary and expansion networks.

As illustrated in FIG. 5, the primary base station 504 comprises 1900 MHz transceiver circuit 512 and the expansion base station 506 comprises 600 MHz transceiver circuit 514. It should be noted that the expansion control circuit 510 may be implemented as a stand alone device or integrated into the primary 504 or expansion 506 base stations. In another implementation, the functions of the expansion control circuit 510 may be distributed between the primary and expansion base stations. In still another implementation, the primary and expansion base stations may be combined into a single device that includes the functions of the expansion control circuit 510.

The expansion control circuit 510 makes the determination about the assignment of the expansion channels based on one or more algorithms that utilize a variety of factors such as available spectrum, power requirements, signal quality characteristics, data types, etc. The following is a list of factors used by the expansion control circuit 510 to determine the assignment of the expansion network. A more detailed description of how primary and expansion channels are assigned in the network expansion system will be described later. It should be noted that the below list is just exemplary and that other factors may be considered by the expansion control circuit 510 to assign the primary and expansion channels.

1. Available spectrum
2. Transmission power criteria
3. Network capacity criteria
4. Types of services to be provided The four modes of operation described above are illustrated in FIG. 5. For example, the device 516 operates in mode 1 so that it utilizes the primary uplink and downlink channels. The device 518 operates in mode 3 so that it utilizes the primary downlink and the expansion uplink channels. The device 520 operates in mode 2 so that it utilizes the expansion downlink and the primary uplink channels. The device 522 operates in mode 4 so that it utilizes the expansion downlink and the expansion uplink channels.

As illustrated by device 520, each device comprises device expansion circuit 524. The device expansion circuit 524 operates to allow a device to determine which channels it is to use to communicate with either the primary or expansion networks. During operation, the device 520 receives handoff messages from either of the primary base station 504 or the expansion base station 506 that allow the device expansion circuit 524 to control the device 520 to switch to designated UL and/or DL channels. A more detailed description of the device expansion circuit 524 will be provided later.

Figure 6:
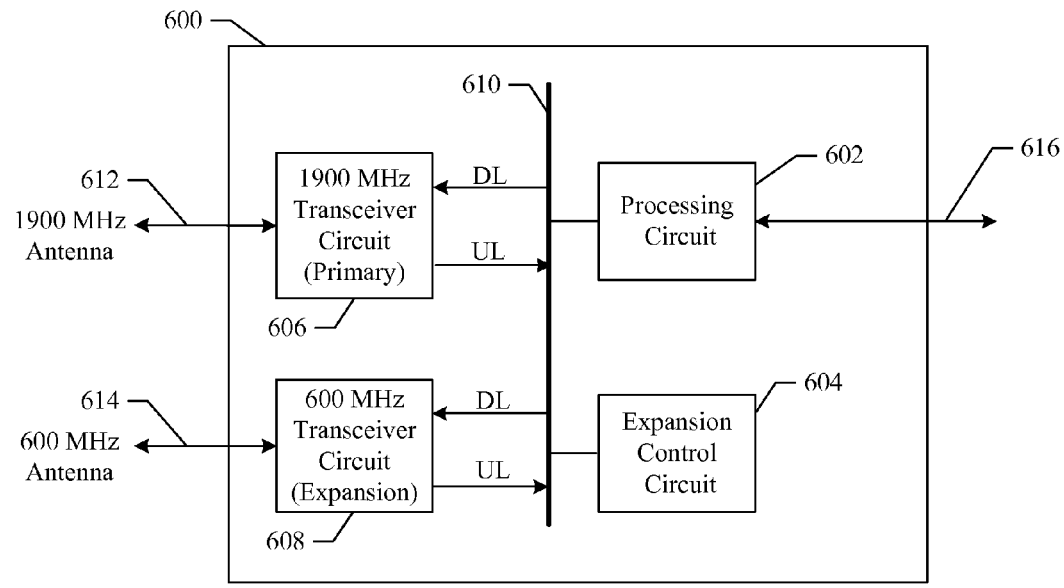
FIG. 6 shows an exemplary base station for use in the network expansion system.

FIG. 6 shows an exemplary base station 600 for use in the network expansion system. For clarity and ease of description, the functions of the primary base station 504, the expansion base station 560, and the expansion control circuit 510 shown in FIG. 5 are incorporated into the base station 600. It should be noted that in other implementations, the function of the network expansion system may be distributed among one or more devices. The base station 600 comprises processing circuit 602, expansion control circuit 604, 1900 MHz transceiver circuit 606, and 600 MHz transceiver circuit 608, all coupled to a data bus 610. It should be noted that the base station 600 represents just one implementation and that other implementations are possible.

The processing circuit 602 comprises at least one of a CPU, processor, gate array, hardware logic, memory elements, and/or hardware executing software. Thus, the processing circuit 602 comprises logic to execute machine-readable instructions and to control one or more other functional elements of the base station 600. The processing circuit 602 also operates to provide communications with other network entities (such as centralized network controllers) over communication channel 614.

The 1900 MHz transceiver circuit 606 comprises hardware and/or hardware executing software that operates to communicate data or other information over a primary network with remote devices or systems. For example, the transceiver circuit 606 is operable to communicate with network devices over a primary UL channel and a primary DL channel. For example, using the DL, the transceiver circuit 606 is operable to transmit configuration information to networked devices using one or more transmission frames that are part of a distribution waveform. The communications on the DL also comprise handoff messages which are provided to allow a device to determine channel assignments on a primary network and an expansion network. On the UL, devices in communication with the base station 600 may transmit device and/or network information, such as channel parameters or other network status information.

The 600 MHz transceiver circuit 608 comprises hardware and/or hardware executing software that operates to communicate data or other information over an expansion network with remote devices or systems. For example, the transceiver circuit 608 is operable to communicate with network devices over an expansion UL channel and an expansion DL channel. For example, using the DL, the transceiver circuit 608 is operable to transmit configuration information to networked devices using one or more transmission frames that are part of a distribution waveform. The communications on the DL also comprise handoff messages which are provided to allow a device to determine channel assignments on a primary network and an expansion network. On the UL, devices in communication with the base station 600 may transmit device and/or network information, such as channel parameters or other network status information.

The expansion control circuit 604 operates to determine which devices are to be serviced using an expansion network. The expansion control circuit 604 also operates to determine which services are to be provided over the expansion network. The expansion control circuit 604 operates to perform an allocation algorithm and a scheduling algorithm that determine how devices and services are to be assigned to the primary and expansion networks. A more detailed description of the allocation and scheduling algorithms is provided below. After determining the results of the allocation and scheduling algorithms, the expansion control circuit 604 passes the information to the processing circuit 602. The processing circuit 602 operates to notify the devices of the assignments using handoff message sent through the transceiver circuit 606 and/or the transceiver circuit 608.

In one implementation, the network expansion system comprises a non-transitory computer program product having one or more program instructions ("instructions") or sets of "codes" stored or embodied on a machine-readable medium. When the codes are executed by at least one processor, for instance, a processor at the processing circuit 602, their execution causes the processor to provide the functions of the network expansion system described herein. For example, the non-transitory machine readable medium comprises a floppy disk, CDROM, memory card, FLASH memory device, RAM, ROM, that interfaces to primary base station 600. Furthermore, the sets of codes may be downloaded into the primary base station 600 from an external device or communication network resource. The sets of codes, when executed, cause the primary base station 600 to provide aspects of a network expansion system as described herein.

Figure 7:
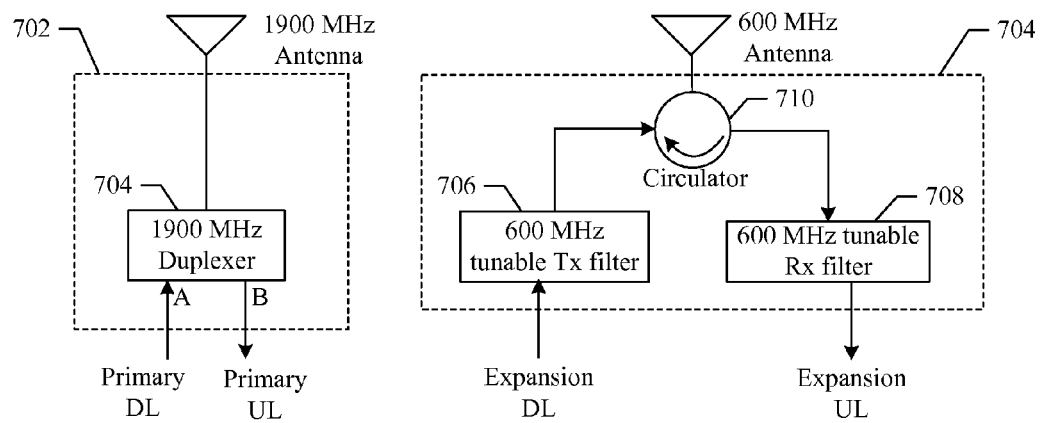
FIG. 7 shows exemplary transceiver circuits for use in the base station of FIG. 6.

FIG. 7 shows exemplary transceiver circuits for use in the base station shown in FIG. 6. For example, the transceiver circuit 702 is suitable for use as the transceiver circuit 606 of the base station 600 shown in FIG. 6. The transceiver circuit 704 is suitable for use as the transceiver circuit 608 of the base station 600 shown in FIG. 6.

The transceiver circuit 702 comprises a 1900 MHz duplexer that operates to provide UL and DL transmission channels over a primary network. The transceiver circuit 704 comprises a 600 MHz tunable transmit filter 706, a 600 MHz tunable receive filter 708 and a circulator 710. The transceiver circuit 704 operates to provide UL and DL transmission channels over an expansion network.

Resource Allocation for Capacity Enhancement

To illustrate capacity enhancement, two base stations serve client stations within a cell as shown in FIG. 5. Therefore, within each cell each client station can be served by the primary network, the expansion network, or a combination of both. Each of these two networks operates in its own frequency band. In this example, the primary network operates in a licensed frequency band and the expansion network operates in an unlicensed frequency band. Each of these bands has its own transmission power regulations. As an example, consider the licensed spectrum to be in the 1900 MHz band, and the unlicensed spectrum to be in the 600 MHz UHF (TV) band. The unlicensed base station transmit power is limited to a lower value than what is permitted in the licensed band. However, in this case, the lower-frequency of the unlicensed frequency band may result in less path loss than in the higher-frequency licensed band.

During operation, the expansion control circuit 604 operates to allocate and schedule resources to the two networks according to the following algorithm. For the purpose of this algorithm it is assumed there are N client stations in the cell.
1. An index (i) is assigned to each client in the cell with $1 \leq i \leq N$.
2. A link quality indicator ($SINR_{i,\ primary}$) is calculated for each client station in the cell in the primary (i.e., legacy) band.
3. A link quality indicator ($SINR_{i,\ exp}$) is calculated for each client station in the cell in the expansion (i.e., unlicensed) band.
4. The following inputs are provided to a scheduling algorithm
   a. $SINR_{i,\ primary}$.
   b. $SINR_{i,\ exp}$.
   c. Throughput requirements for each user.
   d. Average throughput served for each user.
   e. Power headroom for each user.
5. Long-term scheduling: For each user the scheduling algorithm decides on the band in which the user will operate.
6. Short-term scheduling: For each user the scheduling algorithm decides on the resources (power, bandwidth and time) allocated to the user each TTI (Transmit Time Interval).

Scheduling Algorithm

Since the primary band and the expansion band, in general, have different propagation characteristics and emission limits, the scheduling function design is different from conventional scheduling algorithms when similar band classes are used in the system. In particular, scheduling is performed by the network expansion system in two stages as shown in FIG. 8.

Figure 8:
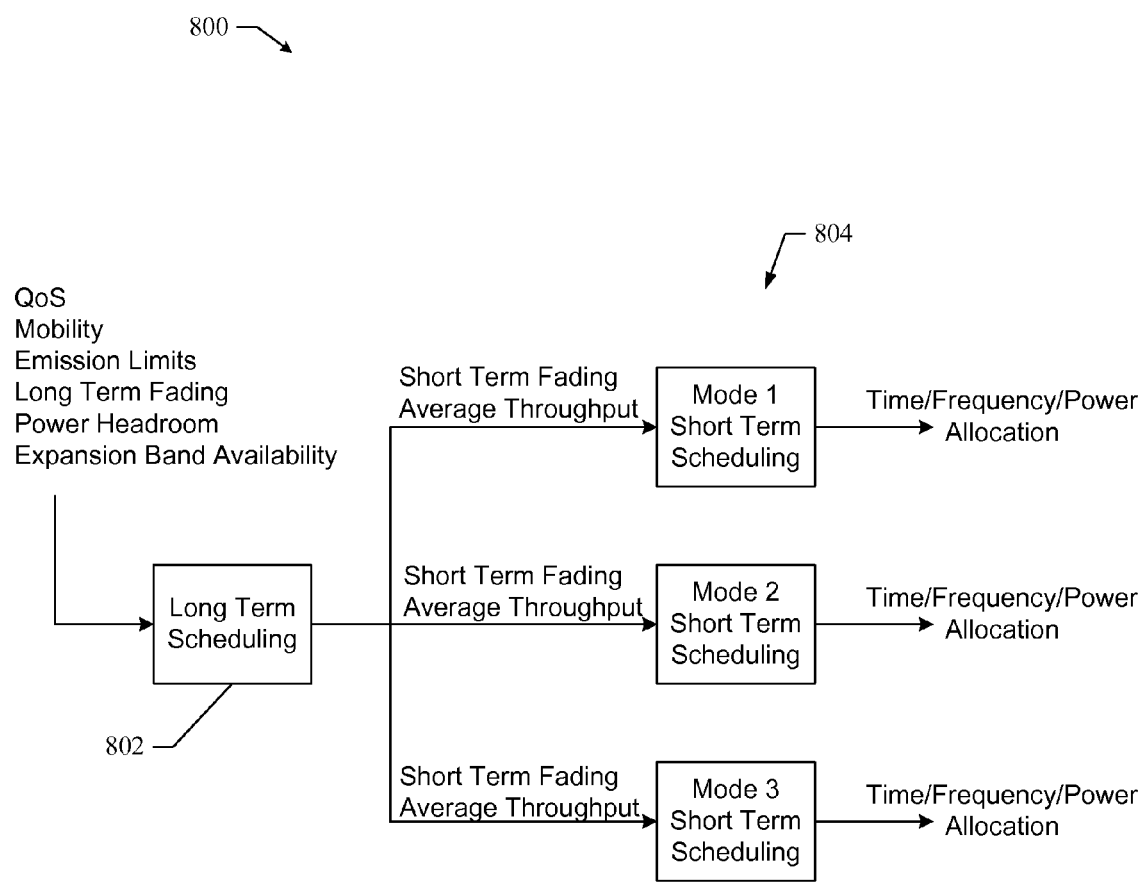
FIG. 8 shows a block diagram illustrating a scheduling algorithm for use in the network expansion system.

FIG. 8 shows a block diagram illustrating a scheduling algorithm 800 performed by the network expansion system. For the purpose of this description, scheduling for modes 1-3 is provided. In this case, there are no clients assigned to mode 4, however, in other scheduling implementations, mode 4 maybe utilized. The scheduling algorithm 800 comprises a first stage 802 that allocates users to one of the three modes. The scheduling algorithm 800 comprises a second stage 804 that allocates resources for each mode. In one implementation, the scheduling algorithm is performed by the expansion control circuit 604.

In the first stage 802, the expansion control circuit 604 calculates the long term fading statistics from all users. Long term fading statistics reflect path-loss and shadow fading. This can be captured in the received pilot power level given that transmit pilot power is known. The first stage also takes as input: power headroom, required Quality of Service (QoS), mobility, emission limits and any general features that differentiate the expansion and primary transmission bands. Thus, the function of the first stage (or long term scheduler) is to allocate different users to one of the three modes (m1-m3).

In the second stage 804, the expansion control circuit 604 allocates time, frequency and power resources to the different users within each mode based on short term fading conditions that can be calculated from channel realizations and also from average served throughput rates.

The operation of the scheduler is described below. It will be assumed that the total number of users is N, and that an initial number of users in the three modes are N1=N, N2=N3=0.

If an expansion band is not available
Allocate all users to Mode 1 (N1=N, N2=0, N3=0). STOP long term scheduler.
Else
Find users with requested QoS or mobility conditions that are not satisfied by the expansion band. Allocate these users to Mode 1 (N1 users).
For the remaining (N-N1) users
a. All users initially use mode 1 to calculate long term fading statistics. Average path-loss and shadowing are calculated for each user from the received power ($P_i$) in the uplink. Each user also reports available power headroom ($PH_i$). Pilots are transmitted using minimum packet formats.
b. The users are sorted according to average path-loss gain (including shadowing) in descending order.
c. Starting from the top of the list, allocate all users with $PH_i=0$ to Mode 3. These are cell edge users in coverage holes who can suffer from high outage probabilities in the primary band with channel fading fluctuations. Allocating these users to Mode 3 will virtually increase their PH through the better propagation conditions in the UL (this helps eliminate or reduce coverage holes).
d. Update the number of users in Mode 3 (N3). Assume the rest of the users are initially in Mode 2 (N2=N-N1-N3).
e. Calculate the average rate achievable by each user. The average rate achieved by each user depends on mode of operation, the long term fading statistics and the number of users in the same mode sharing the spectrum with this user. For example the average rate of user (i) who is in mode k can be approximately calculated by;

$$R_i = \frac{B_k}{N_k} \cdot \log(1 + SINR_{i,k})$$

where $B_k$ and $N_k$ denote the bandwidth of the channel and number of users in Mode k, respectively.

f. Calculate a utility function of the rates of all users depending on selected fairness criteria. For example, if the fairness criterion is long-term proportional fairness, calculate the utility functions as follows.

$$U(R_i) = \sum_{i=1}^{N} \log(R_i)$$

g. Move the user with highest path-loss from Mode 2 to Mode 3.
h. Update N2 and N3. Update rates and utility function as in (e) and (f) above.
i. If the utility function increased, go to operation (g), otherwise STOP the long term scheduling stage.

After all users have been allocated to the three modes, short term scheduling within each mode starts. This can be done using conventional scheduler techniques as short term proportional fairness (PF) or EGoS scheduling. For example, if proportional fair scheduling is used, then for the subset of users in Mode k schedule user i that maximizes the following cost function $$PF_i(t) = \frac{r_i(t)}{H_i(t)}$$

where $r_i(t)$ is the requested throughput of user i in time t and is a function of channel realization and $H_i(t)$ is the average smoothed throughput served to user i. The cost function above can be generalized for multicarrier systems.

In one implementation, if new user/users join the system, similar steps as above are used. The rate of update for the long term scheduler depends on the level of mobility of the users. Since long-term fading statistics change on a slower rate than channel realization, the long-term scheduler happens on a larger time scale compared to short-term scheduling.

Different cost functions can be used to design the long-term scheduler depending on the required criteria. For example, the cost function that maximizes sum throughput, maximum throughput, and any general fairness criteria can be used. Another possible input to the long-term scheduling function is the inter-cell interference. For example, users can be moved from one band to another depending on the level of interference caused to adjacent cells. This can be thought of as a load-balancing criterion.

Figure 9:
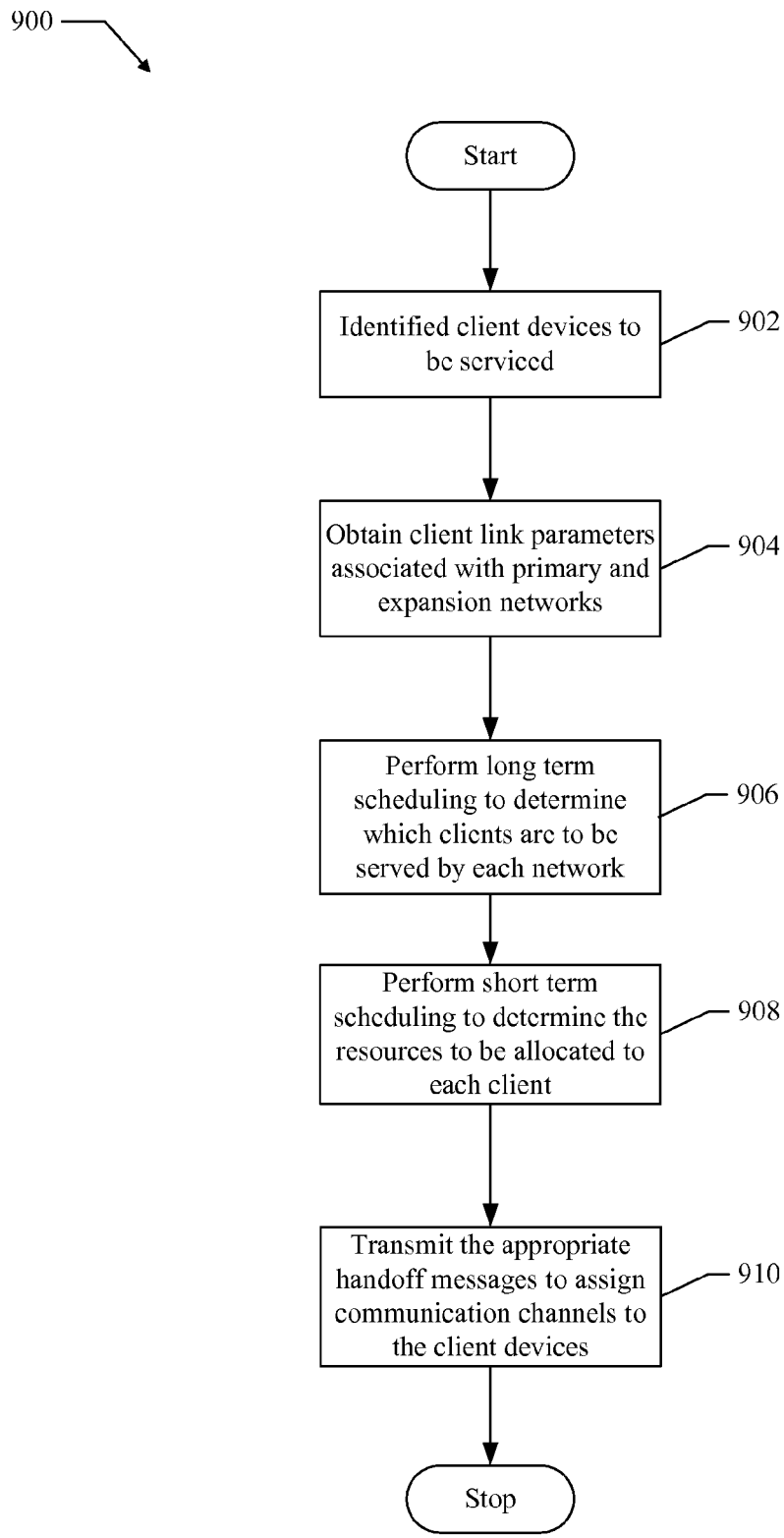
FIG. 9 shows an exemplary method for providing allocation and scheduling for use in the network expansion system.

FIG. 9 shows an exemplary method 900 for providing allocation and scheduling for use in the network expansion system. For clarity, the method 900 is described below with reference to the base station 600 shown in FIG. 6. For example, the processing circuit 602 executes one or more sets of codes to control the base station 600 to perform the functions described below.

At block 902, client devices are identified. The processing circuit 602 operates to identify clients in a primary network.

At block 904, client link parameters associated with primary and expansion networks are obtained. For example, the processing circuit 602 operates to obtain client link parameters associated with the primary network from the transceiver circuit 606. The processing circuit 602 also operates to obtain client link parameters associated with the expansion network. For example, the client link parameters associated with the expansion network may be received from clients by the transceiver circuit 606 using the primary network. In another implementation, the client link parameters associated with the expansion network may be received from clients by the transceiver circuit 608 using the expansion network. Thus, the processing circuit 602 operates to determine client link parameters associated with one or both of the primary network and the expansion network.

At block 906, long term scheduling is performed to determine which clients are to be served by the primary and expansion networks. Thus, the long term scheduling determines the operating mode for each client as described above. In one implementation, the expansion control circuit 604 receives the client link parameters from the processing circuit 602 and performs long term scheduling using the algorithm described above. For example, in one implementation, long term scheduling is performed based on at least one of QoS, mobility, emission limits, long term fading, power headroom, and expansion band availability.

At block 908, short term scheduling is performed to determine the resources to be allocated to each client by the primary and expansion networks. For example, the expansion control circuit 604 performs short term scheduling using the algorithm described above. For example, in one implementation, short term scheduling is performed to determine at least one of time, frequency, and power resources allocated to each client.

At block 910, handoff messages are transmitted to the device to assign communication channels on the primary and expansion networks. For example, the processing circuit 602 generates the handoff messages for transmission to the devices by the transceiver circuit 606. Once the devices receive the handoff messages they operate to tune to the assigned communication channels which may be on either or both of the primary and expansion networks.

Therefore, the method 900 operates to provide allocation and scheduling for use in aspects of a network expansion system. It should be noted that the method 900 is just one implementation and that the operations of the method 900 may be rearranged or otherwise modified within the scope of the various aspects. Thus, other implementations are possible with the scope of the various aspects described herein.

Figure 10:
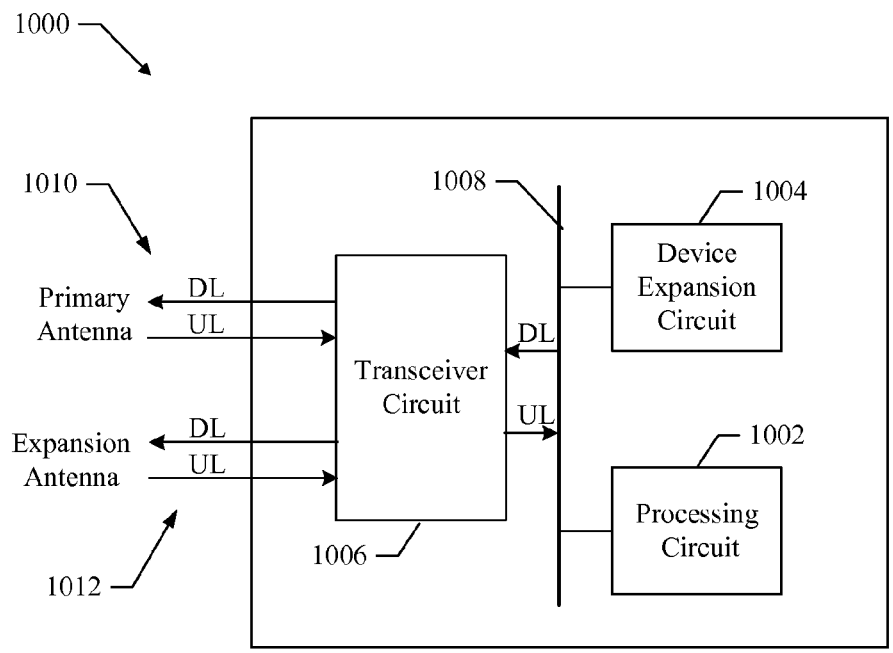
FIG. 10 shows an exemplary device for use in the network expansion system.

FIG. 10 shows an exemplary device 1000 for use in the network expansion system. For example, the device 1000 is suitable for use as the device 520 shown in FIG. 5. The device 1000 comprises processing circuit 1002, device expansion circuit 1004 and transceiver circuit 1006 all coupled to a data bus 1008. It should be noted that the device 1000 represents just one implementation and that other implementations are possible.

The processing circuit 1002 comprises at least one of a CPU, processor, gate array, hardware logic, memory elements, and/or hardware executing software. Thus, the processing circuit 1002 comprises logic to execute machine-readable instructions and to control one or more other functional elements of the device 1000.

The transceiver circuit 1006 comprises hardware and/or hardware executing software that operates to allow the device 1000 to communicate data or other information over a primary network and/or an expansion network. The transceiver circuit 1006 is operable to communicate over expansion UL and DL channels, as shown at 1012. The transceiver circuit 1006 is also operable to communicate over a primary UL and DL channels, as shown at 1010. For example, the device expansion circuit 1004 operates to control the transceiver circuit 1006 to determine which of the UL and DL channels the device will use to communicate with network entities.

The device expansion circuit 1004 comprises at least one of a CPU, processor, gate array, hardware logic, memory elements, and/or hardware executing software. The device expansion circuit 1004 operates to receive handoff messages and based on these messages determines which UL and DL channels the device is to use for network communications. The handoff messages specify a transmission mode in which the device determines which UL and DL channels to use for network communication. A more detailed description of the operation of the device expansion circuit 1004 will be provided later.

In one implementation, the network expansion system comprises a computer program product having one or more program instructions ("instructions") or sets of "codes" stored or embodied on a machine-readable medium. When the codes are executed by at least one processor, for instance, a processor at the processing circuit 1002, their execution causes the processor to provide the functions of the network expansion system described herein. For example, the machine-readable medium comprises a floppy disk, CDROM, memory card, FLASH memory device, RAM, ROM, or any other type of memory device or machine-readable medium that interfaces to device 1000. Furthermore, the sets of codes may be downloaded into the device 1000 from an external device or communication network resource. The sets of codes, when executed, cause the device 1000 to provide aspects of a network expansion system as described herein.

Figure 11:
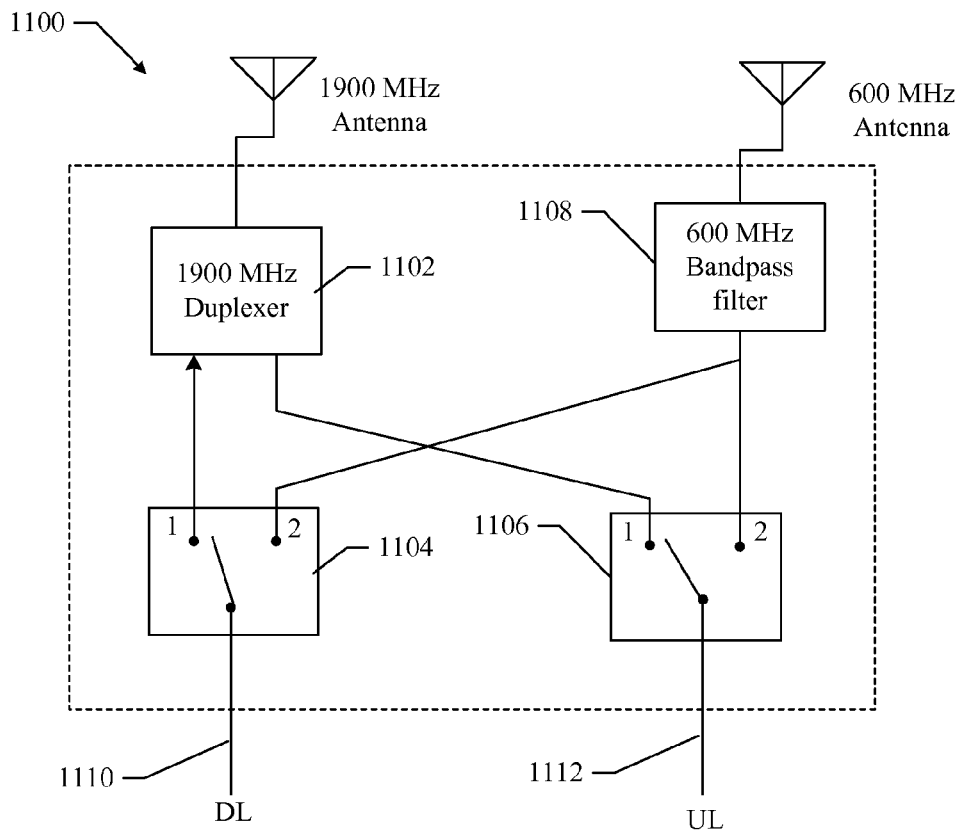
FIG. 11 shows exemplary transceiver circuit for use in the device of FIG. 10.

FIG. 11 shows an exemplary transceiver circuit 1100 for use in the device 1000 shown in FIG. 10. For example, the transceiver circuit 1100 is suitable for use as the transceiver circuit 1006 shown in FIG. 10. The transceiver circuit 1100 comprises 1900 MHz duplexer 1102, first switch 1104, second switch 1106, and 600 MHz bandpass filter 1108.

The 1900 MHz duplexer 1102 is coupled to a first switch 1104 and a second switch 1106. Signals received from a primary network by a 1900 MHz antenna are passed from the 1900 MHz duplexer 1102 to the second switch 1106. Signals to be transmitted over the primary network are passed from the first switch 1104 to the 1900 MHz duplexer 1102. In a similar fashion, signals received over an expansion network by a 600 MHz antenna are passed from the 600 MHz bandpass filter 1108 to the second switch 1106. Signals to be transmitted over the expansion network are passed from the first switch 1104 to the 600 MHz bandpass filter 1108.

Thus, a transmission signal 1110 from a device passes through the first switch 1104 and may be transmitted on either the primary network or the expansion network based on the position of the first switch 1104. A signal received from the primary network or the expansion network flows to the second switch 1106 which selects one of these signals to be the received signal 1112 to be processed by the device. For example, the device expansion circuit 1004 operates to control the operation of the switches 1104 and 1106 to control the operating mode of the device 1000. Therefore, the transceiver circuit 1100 provides communication over any combination of UL and DL channels provided by a primary network and an expansion network.

Figure 12:
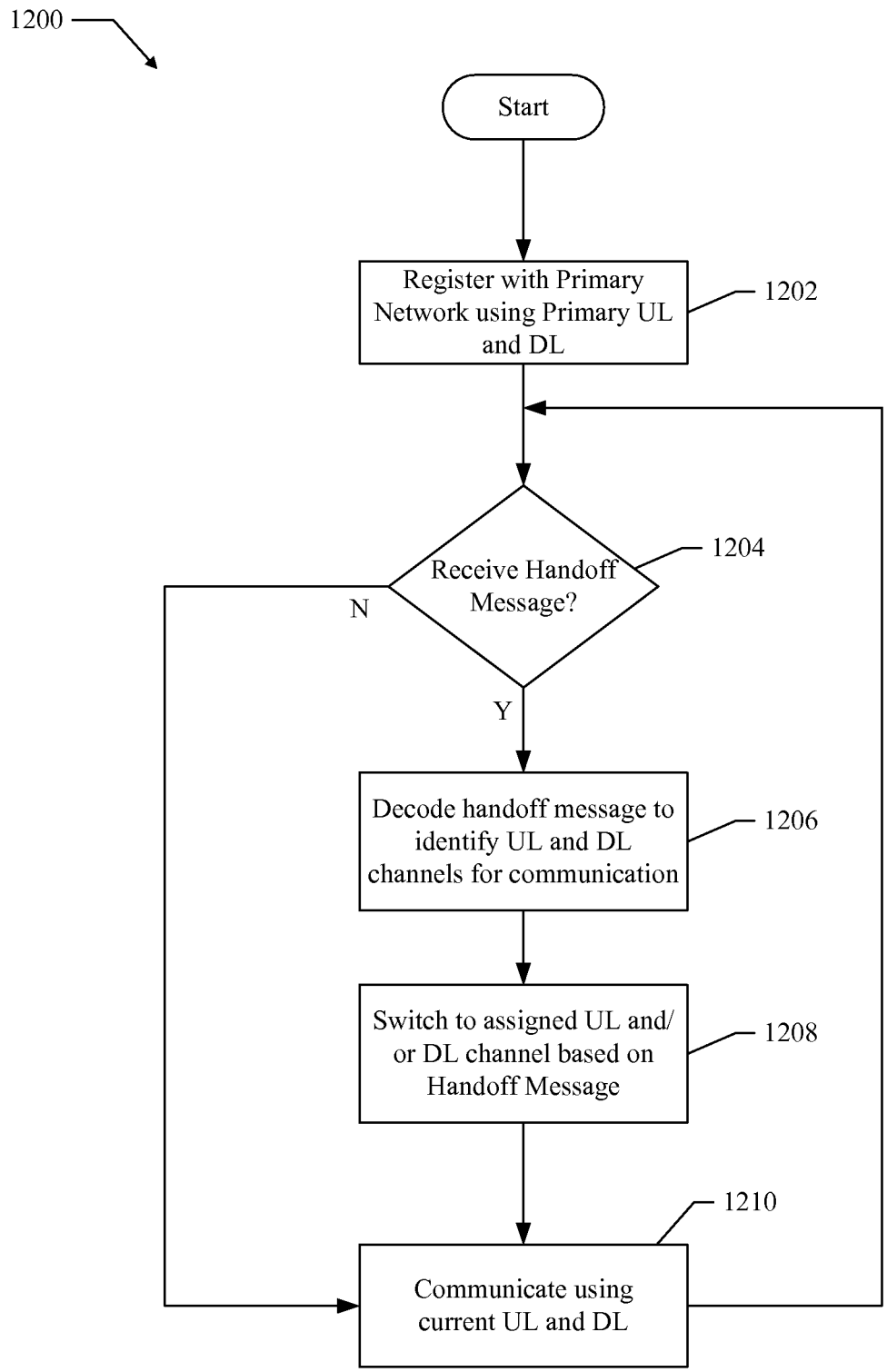
FIG. 12 shows an exemplary method for operating a device in accordance with the network expansion system.

FIG. 12 shows an exemplary method 1200 for operating a device in accordance with the network expansion system. For clarity, the method 1200 is described below with reference to the device 1000 shown in FIG. 10 and the transceiver circuit 1100 shown in FIG. 11. For example, the processing circuit 1002 executes one or more sets of codes to control the device 1000 to perform the functions described below.

At block 1202, registration with a primary network is performed. For example, the devices 508 shown in FIG. 5 operate to register with the primary network by communicating with the primary base station 504. Registration is performed using primary UL and DL channels. In one implementation, the processing circuit 1002 operates to control the transceiver circuit 1006 to transmit and receive information over the primary UL and DL channels to perform registration with the primary network.

At block 1204, a determination is made as to whether a handoff message has been received over the current DL channel. The processing circuit 1002 makes this determination. If a handoff message has not been received, the method proceeds to block 1210. If a handoff message has been received, the method proceeds to block 1206.

At block 1206, the handoff message is decoded. The device expansion circuit 1004 decodes the received handoff message and identifies the UL and DL channels that have been assigned to the device. Each of the UL and DL channels that are assigned may be on either the primary network or the expansion network. Thus, the device expansion circuit 1004 determines the operating mode to be used by the device.

At block 1208, a switch to the assigned uplink and/or downlink channels is performed. The processing circuit 1004 controls the transceiver circuit 1006 to switch one or both of the UL and DL channels that have been assigned to the device. For example, the switches 1104 and 1106 are set to the appropriate position to allow DL communications over either the primary network or the expansion network, and UL communication over either the primary network or the expansion network. Thus, the processing circuit 1004 controls the transceiver circuit 1006 to allow the device 1000 to operate using any of the four transmission modes described above.

At block 1210, network communications occur using the currently selected UL and DL channels.

Therefore, the method 1200 operates to allow a device to communicate with primary and expansion networks using the appropriate UL and DL channels. It should be noted that the method 1200 is just one implementation and that the operations of the method 1200 may be rearranged or otherwise modified within the scope of the various aspects. Thus, other implementations are possible with the scope of the various aspects described herein.

Descriptions of the hardware implementations of the above-described embodiments are exemplary. As known in the art, the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a network expansion system has been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

The invention claimed is:

1. An apparatus for network communication, the apparatus comprising:
 expansion circuit configured to identify at least one of a selected uplink (UL) channel and a selected downlink (DL) channel, wherein the selected UL channel is provided by one of a primary network and an expansion network, and wherein the selected DL channel is provide by one of the primary network and the expansion network, and the selected UL channel and selected DL channel are selected from one of four modes: primary uplink and primary downlink; primary uplink and expansion downlink; expansion uplink and primary downlink; expansion uplink and expansion downlink, wherein the primary uplink or downlink channels are supported by the primary network, and the expansion uplink or downlink channels are supported by the expansion network; and
 processing circuit configured to switch to selected mode.

2. The apparatus of claim 1, further comprising a transceiver configured to
 receive a handoff message, and wherein said expansion circuit is configured to identify the selected mode based on the handoff message.

3. The apparatus of claim 1, wherein the expansion network utilizes unlicensed spectrum.

4. The apparatus of claim 3, wherein the unlicensed spectrum comprises TV white space.

5. The apparatus of claim 1, wherein the expansion network utilizes free spectrum.

6. A method for network communication, the method comprising:
identifying at least one of a selected uplink (UL) channel and a selected downlink (DL) channel, wherein the selected UL channel is provided by one of a primary network and an expansion network, and wherein the selected DL channel is provide by one of the primary network and the expansion network, and the selected UL channel and selected DL channel are selected from one of four modes: primary uplink and primary downlink; primary uplink and expansion downlink; expansion uplink and primary downlink; expansion uplink and expansion downlink, wherein the primary uplink or downlink channels are supported by the primary network, and the expansion uplink or downlink channels are supported by the expansion network; and
switching to the selected mode.

7. The method of claim 6, further comprising receiving a handoff message,
and wherein said identifying comprises identifying the selected mode based on the handoff message.

8. The method of claim 6, wherein the expansion network utilizes unlicensed spectrum.

9. The method of claim 8, wherein the unlicensed spectrum comprises TV white space.

10. The method of claim 6, wherein the expansion network utilizes free spectrum.

11. An apparatus for network communication, the apparatus comprising:
means for identifying at least one of a selected uplink (UL) channel and a selected downlink (DL) channel, wherein the selected UL channel is provided by one of a primary network and an expansion network, and wherein the selected DL channel is provide by one of the primary network and the expansion network, and the selected UL channel and selected DL channel are selected from one of four modes: primary uplink and primary downlink; primary uplink and expansion downlink; expansion uplink and primary downlink; expansion uplink and expansion downlink, wherein the primary uplink or downlink channels are supported by the primary network, and the expansion uplink or downlink channels are supported by the expansion network; and
means for switching to the selected mode.

12. The apparatus of claim 11, further comprising means for receiving a handoff message, and wherein said means for identifying comprises identifying the selected mode based on the hand off message.

13. The apparatus of claim 11, wherein the expansion network utilizes unlicensed spectrum.

14. The apparatus of claim 13, wherein the unlicensed spectrum comprises TV white space.

15. The apparatus of claim 11, wherein the expansion network utilizes free spectrum.

16. A non-transitory computer readable-medium for network communication, the non-transitory computer readable-medium comprising:
executable codes when executed by a processor to:
identify at least one of a selected uplink (UL) channel and a selected downlink
(DL) channel, wherein the selected UL channel is provided by one of a primary network
and an expansion network, and wherein the selected DL channel is provide by one of the primary network and the expansion network, and the selected UL channel and selected DL channel are selected from one of four modes: primary uplink and primary downlink; primary uplink and expansion downlink; expansion uplink and primary downlink; expansion uplink and expansion downlink, wherein the primary uplink or downlink channels are supported by the primary network, and the expansion uplink or downlink channels are supported by the expansion network; and
switch to the selected mode.

17. A mobile device for communicating over primary and expansion networks, the mobile device comprising:
an antenna;
expansion circuit configured to identify at least one of a selected uplink (UL) channel and a selected downlink (DL) channel, wherein the selected UL channel is provided by one of a primary network and an expansion network, and wherein the selected DL channel is provide by one of the primary network and the expansion network, and the selected UL channel and selected DL channel are selected from one of four modes: primary uplink and primary downlink; primary uplink and expansion downlink; expansion uplink and primary downlink; expansion uplink and expansion downlink wherein the primary uplink or downlink channels are supported by the primary network, and the expansion uplink or downlink channels are supported by the expansion network; and
processing circuit coupled to the antenna and configured to switch to the selected mode.

18. An apparatus for network communication, the apparatus comprising:
processing circuit configured to obtain link parameters associated with a primary network and an expansion network wherein the expansion network may or may not be co-located and operates in a geographic region and may utilize unlicensed spectrum;
expansion control circuit configured to identify clients that are assigned transmission channels on both the primary network and the expansion network based on the link parameters, wherein, a selected UL channel and a selected DL channel are selected from one of four modes: primary uplink and primary downlink; primary uplink and expansion downlink; expansion uplink and primary downlink; expansion uplink and expansion downlink, wherein the primary uplink or downlink channels are supported by the primary network, and the expansion uplink or downlink channels are supported by the expansion network; and
transceiver circuit configured to transmit messages to the clients to indicate the assigned transmission mode.

19. The apparatus of claim 18, wherein said expansion control circuit is configured to perform an algorithm to identify portions of the clients to be served by each of four transmission modes, wherein each of the four transmission modes comprises a respective uplink (UL) channel selected from the primary network and the expansion network based on the link parameters, and a respective downlink (DL) channel selected from the primary network and the expansion network based on the link parameters.

20. The apparatus of claim 19, wherein said algorithm comprises long term scheduling to identify the portions of the clients based on at least one of QoS, mobility, emission limits, long term fading, power headroom, and expansion band availability.

21. The apparatus of claim 19, wherein said algorithm comprises short term scheduling to determine at least one of time, frequency, and power resources allocated to each client.

22. The apparatus of claim 19, wherein said transceiver circuit is configured to transmit a handoff message to each client to indicate the respective UL and DL transmission channels that have been assigned.

23. The apparatus of claim 18, wherein said link parameters comprise signal strength measurements relative to the primary and expansion networks.

24. A method for network communication, the method comprising:
obtaining link parameters associated with a primary network and an expansion network wherein the expansion network may or may not be co-located and operates in a geographic region and may utilize unlicensed spectrum;
identifying clients that are assigned to one of four transmission modes: primary uplink and primary downlink; primary uplink and expansion downlink; expansion uplink and primary downlink; expansion uplink and expansion downlink, based on the link parameters, wherein the primary uplink or downlink channels are supported by the primary network, and the expansion uplink or downlink channels are supported by the expansion network; and
transmitting messages to the clients to indicate the assigned transmission mode.

25. The method of claim 24, wherein said identifying comprises performing an algorithm to identify portions of the clients to be served by each of four transmission modes, wherein each of the four transmission modes comprises a respective uplink (UL) channel selected from the primary network and the expansion network based on the link parameters, and a respective downlink (DL) channel selected from the primary network and the expansion network based on the link parameters.

26. The method of claim 25, wherein said performing comprises long term scheduling to identify the portions of the clients based on at least one of QoS, mobility, emission limits, long term fading, power headroom, and expansion band availability.

27. The method of claim 25, wherein said performing comprises short term scheduling to determine at least one of time, frequency, and power resources allocated to each client.

28. The method of claim 25, wherein said transmitting comprises transmitting a handoff message to each client to indicate the respective UL and DL transmission channels that have been assigned.

29. The method of claim 24, wherein said link parameters comprise signal strength measurements relative to the primary and expansion networks.

30. An apparatus for network communication, the apparatus comprising:
means for obtaining link parameters associated with a primary network and an expansion network wherein the expansion network may or may not be co-located and operates in a geographic region and may utilize unlicensed spectrum;
means for identifying clients that are assigned to one of four transmission modes: primary uplink and primary downlink; primary uplink and expansion downlink; expansion uplink and primary downlink; expansion uplink and expansion downlink, based on the link parameters, wherein the primary uplink or downlink channels are supported by the primary network, and the expansion uplink or downlink channels are supported by the expansion network; and
means for transmitting messages to the clients to indicate the assigned transmission mode.

31. The apparatus of claim 30, wherein said means for identifying comprises means for performing an algorithm to identify portions of the clients to be served by each of four transmission modes, wherein each of the four transmission modes comprises a respective uplink (UL) channel selected from the primary network and the expansion network based on the link parameters, and a respective downlink (DL) channel selected from the primary network and the expansion network based on the link parameters.

32. The apparatus of claim 31, wherein said means for performing comprises means for long term scheduling to identify the portions of the clients based on at least one of QoS, mobility, emission limits, long term fading, power headroom, and expansion band availability.

33. The apparatus of claim 31, wherein said means for performing comprises means for short term scheduling to determine at least one of time, frequency, and power resources allocated to each client.

34. The apparatus of claim 31, wherein said means for transmitting comprises means for transmitting a handoff message to each client to indicate the respective UL and DL transmission channels that have been assigned.

35. The apparatus of claim 30, wherein said link parameters comprise signal strength measurements relative to the primary and expansion networks.

36. A non-transitory computer readable-medium for network communication, the non-transitory computer readable-medium comprising:
executable codes when executed by a processor to:
obtain link parameters associated with a primary network and an expansion
network wherein the expansion network may or may not be co-located and operates in a geographic region and may utilize unlicensed spectrum;
identify clients that are assigned to one of four transmission modes: primary uplink and primary downlink; primary uplink and expansion downlink; expansion uplink and primary downlink; expansion uplink and expansion downlink based on the link parameters, wherein the primary uplink or downlink channels are supported by the primary network, and the expansion uplink or downlink channels are supported by the expansion network; and
transmit messages to the clients to indicate the assigned transmission mode.

37. A base station for communicating over primary and expansion networks, the base station comprising:
at least one antenna;
processing circuit coupled to the at least one antenna and configured to obtain link parameters associated with a primary network and an expansion network wherein the expansion network may or may not be co-located and operates in a geographic region and may utilize unlicensed spectrum;
expansion control circuit configured to identify clients that are assigned to one of four transmission modes: primary uplink and primary downlink; primary uplink and expansion downlink; expansion uplink and primary downlink; expansion uplink and expansion downlink based on the link parameters, wherein the primary uplink or downlink channels are supported by the primary network, and the expansion uplink or downlink channels are supported by the expansion network; and
transceiver circuit configured to transmit messages to the clients to indicate the assigned transmission mode.

* * * * *